US012583247B2

(12) United States Patent
Aoki et al.

(10) Patent No.: US 12,583,247 B2
(45) Date of Patent: Mar. 24, 2026

(54) DRYING METHOD, DRYING DEVICE, AND PRINTING DEVICE

(71) Applicant: SEIKO EPSON CORPORATION, Tokyo (JP)

(72) Inventors: Yuki Aoki, Shiojiri (JP); Tomohiro Yoda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 243 days.

(21) Appl. No.: 18/451,209

(22) Filed: Aug. 17, 2023

(65) Prior Publication Data

US 2024/0059092 A1 Feb. 22, 2024

(30) Foreign Application Priority Data

Aug. 17, 2022 (JP) ................................ 2022-129923

(51) Int. Cl.
*B41M 7/00* (2006.01)
*B41J 11/00* (2006.01)

(52) U.S. Cl.
CPC .......... *B41M 7/009* (2013.01); *B41J 11/0022* (2021.01); *B41J 11/00242* (2021.01); *B41J 11/007* (2013.01)

(58) Field of Classification Search
CPC ...... B41J 11/00242; B41J 2/01; B41J 19/142; B41M 7/009
See application file for complete search history.

(56) References Cited

U.S. PATENT DOCUMENTS 4,982,207 A * 1/1991 Tunmore ............. B41J 11/0024 346/138
10,543,684 B2 * 1/2020 Matsumoto .............. B41J 11/02
10,603,928 B2 * 3/2020 Matsumoto ............ B41J 2/2117
11,518,181 B2 * 12/2022 Washizawa .......... B41J 11/0085
2012/0062640 A1 * 3/2012 Uraki ................... B41J 2/16552 347/18
2013/0015285 A1 * 1/2013 Uruma ................. B65H 20/005 242/420.5
2014/0375734 A1 * 12/2014 Takeuchi ................... B41J 2/01 347/100
2018/0037022 A1 * 2/2018 Sasaki .................. B41J 2/04553
2018/0222205 A1 * 8/2018 Otokita ....................... B41J 2/01
2018/0236783 A1 * 8/2018 Matsuzaki ........... B41J 11/0015
2021/0094327 A1 * 4/2021 Hamada ................. B41J 11/002
2021/0170779 A1 * 6/2021 Asakawa ............. C09D 11/033
2021/0300070 A1 9/2021 Shuichiro
2022/0111666 A1 * 4/2022 Saito ...................... B41J 25/006
2022/0371340 A1 * 11/2022 Kaburagi ........... B41J 11/00242

FOREIGN PATENT DOCUMENTS

JP 2021-151737 A 9/2021

* cited by examiner

*Primary Examiner* — John P Zimmermann
(74) *Attorney, Agent, or Firm* — Dority & Manning, P.A.

(57) ABSTRACT

A drying method includes a heat step of heating the medium, a transport step of transporting the medium in the transport direction, and an air blowing step of blowing air to the medium while heating the transported medium, and the temperature is adjusted in each of the heating step and the air blowing step.

12 Claims, 7 Drawing Sheets

DRYING METHOD, DRYING DEVICE, AND PRINTING DEVICE

The present application is based on, and claims priority from JP Application Serial Number 2022-129923, filed Aug. 17, 2022, the disclosure of which is hereby incorporated by reference herein in its entirety.

BACKGROUND

1. Technical Field

The present disclosure relates to a drying method, a drying device, and a printing device.

2. Related Art

In the related art, as shown in JP-A-2021-151737, it is disclosed that the temperature is lowered at a section where air is blown in an apparatus that dries ink that was ejected onto a medium, by blowing air while heating the ink by a heating section.

However, in the apparatus described in JP-A-2021-151737, when an attempt is made to raise the temperature of the section of the heating section that is exposed to the blown air, the temperature of the section that is not exposed to the blown air may increase excessively or otherwise an appropriate temperature may not be achieved.

SUMMARY

A drying method according to the disclosure includes a heating step of heating a medium; a transport step of transporting the medium in a transport direction; and an air blowing step of blowing air to the medium while heating the transported medium, wherein temperature adjustment is performed in the heating step and in the blowing step.

A drying device according to the disclosure includes a heating section that heats a medium; a transport section that transports the medium in a transport direction; and a blower section configured to blow air to the heated medium, wherein the heating section includes a first heating section to which air is not blown by the blower section and a second heating section to which air is blown by the blower section, and the first heating section and the second heating section each perform temperature adjustment.

Further, a printing device according to the disclosure includes a printing section that performs printing by ejecting ink onto a medium; a heating section that heats the medium; a transport section that transports the medium in a transport direction; blower section configured to blow air to the heated medium, wherein the heating section includes a first heating section to which air is not blown by the blower section and a second heating section to which air is blown by the blower section, and the first heating section and the second heating section each perform temperature adjustment.

DESCRIPTION OF EMBODIMENTS

1. Embodiment of Printing Device

Figure 1:
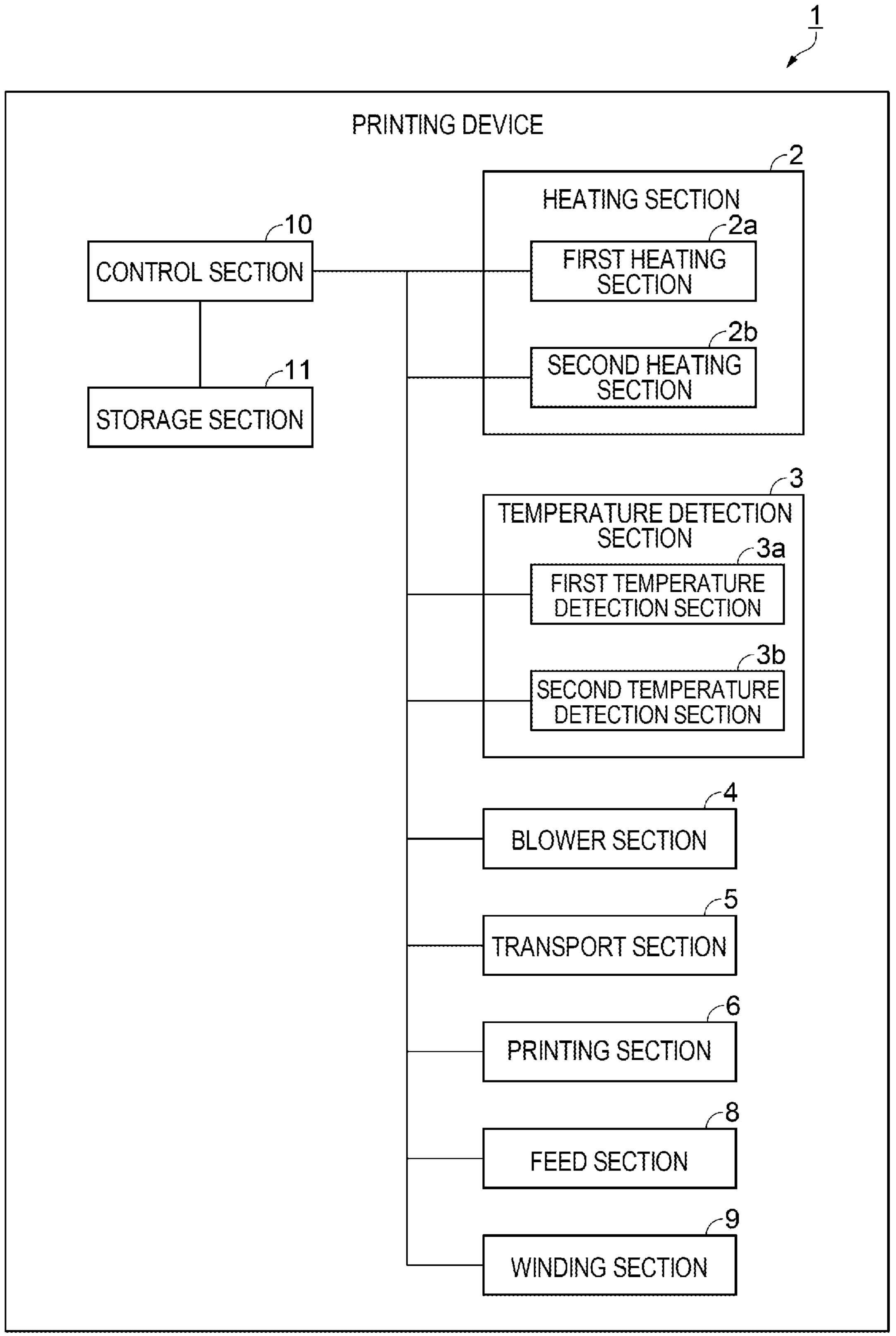
FIG. 1 is a block diagram illustrating configuration of a printing device.

Hereinafter, an embodiment of a printing device 1 will be described with reference to the drawings. Directions in the drawings will be described using a three dimensional coordinate system. For convenience of explanation, the positive direction of the Z axis is referred to as an upward direction or simply upward, the negative direction is referred to as a downward direction or simply downward, the positive direction of the X axis is referred to as a rightward direction or simply right, the negative direction is referred to as a leftward direction or simply left, the positive direction of the Y axis is referred to as a forward direction or simply forward, and the negative direction is referred to as a rearward direction or simply rearward. In the drawings showing embodiments of the drying device 1*a* (to be described later), the directions are indicated in the same manner.

1.1. Configuration of Printing Device

As illustrated in FIG. 1, the printing device 1 includes a heating section 2, a temperature detection section 3, a blower section 4, a transport section 5, a printing section 6, a feed section 8, a winding section 9, a control section 10, and a storage section 11.

Further, the heating section 2 includes a first heating section 2*a* and a second heating section 2*b*. The temperature detection section 3 includes a first temperature detection section 3*a* and a second temperature detection section 3*b*.

Figure 5:
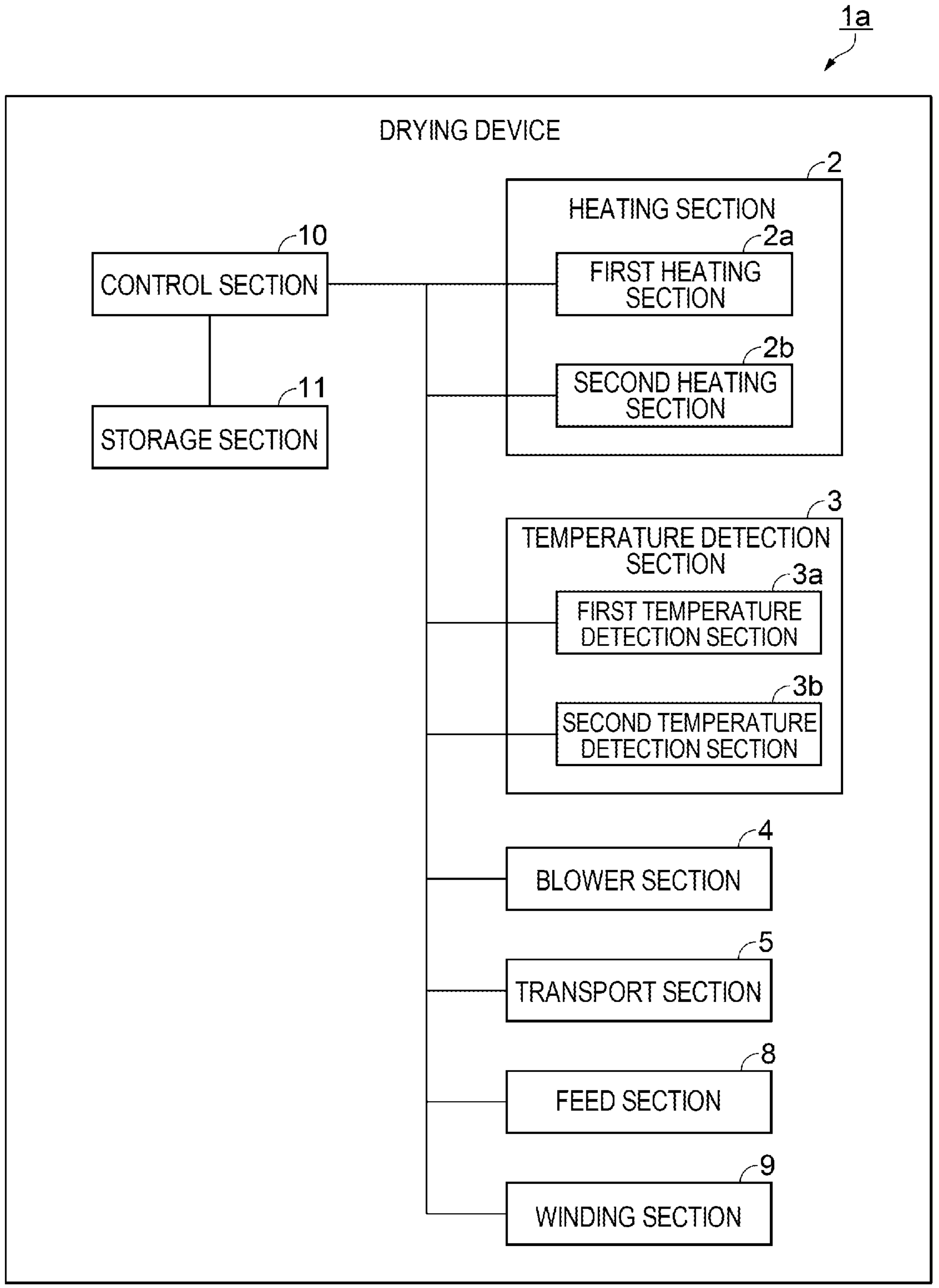
FIG. 5 is a block diagram showing configuration of a drying device.
Figure 6:
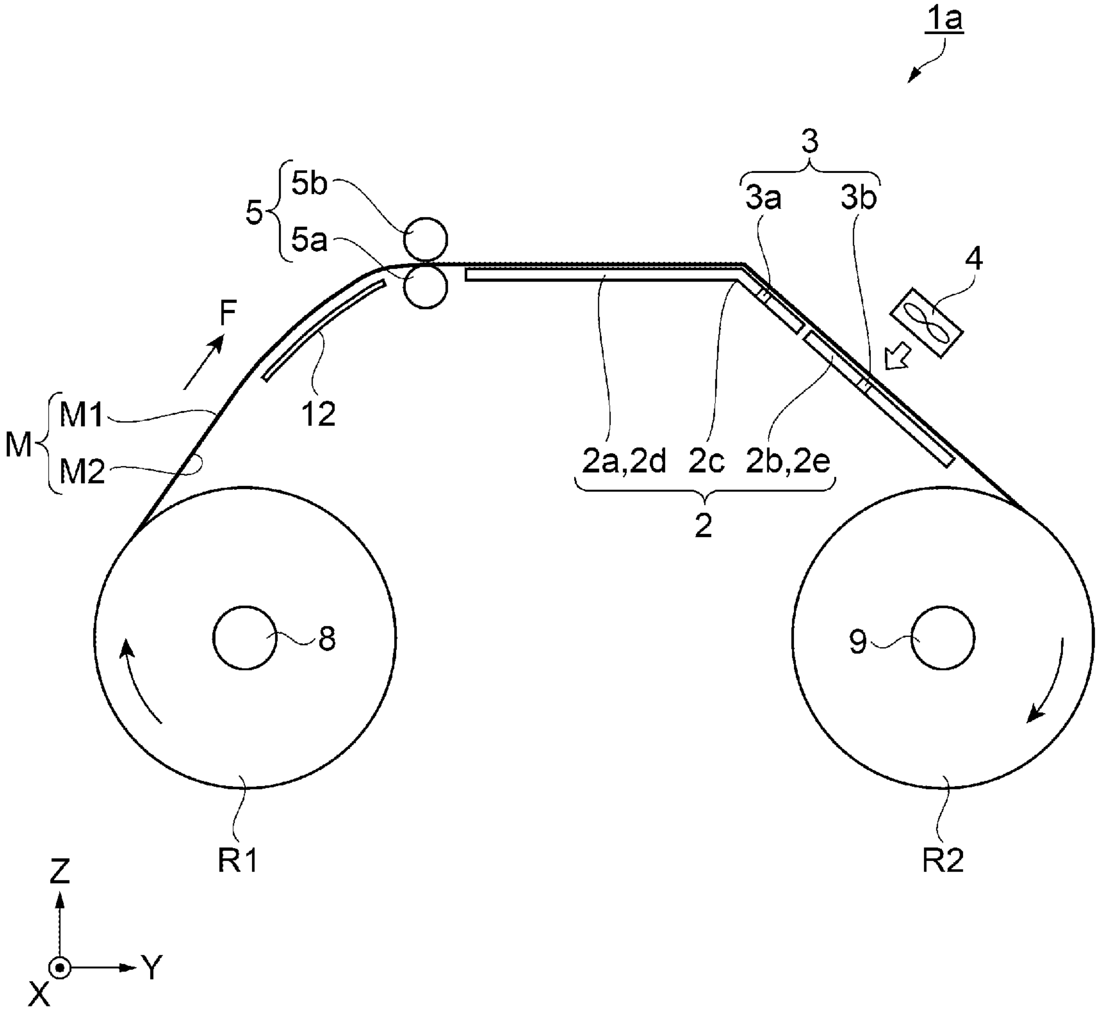
FIG. 6 is a schematic view showing a cross section of configuration of the drying device.

Configuration of the printing device 1 will be described with reference to FIG. 2. Note that as shown in FIGS. 5 and 6, the drying device 1*a* (to be described later) has configuration of the printing device 1 with at least the printing section 6 removed. The configuration of the drying device 1*a* is the same as that of the printing device 1 described below except for at least the printing section 6.

The control section 10 includes a central processing section (CPU) that integrally controls sections of the printing device 1, a universal asynchronous receiver transmitter (UART) that manages input and output, and a field programmable gate array (FPGA) or a programmable logic device (PLD), which are logic circuits, and the like. The CPU is also referred to as a processor.

The storage section 11 includes a flash read only memory (ROM) or a hard disk drive (HDD) which are rewritable nonvolatile memories, a random access memory (RAM) which is a volatile memory, and the like.

The CPU of the control section 10 reads a program such as firmware stored in the nonvolatile memory of the storage section 11, and executes the program using the volatile memory of the storage section 11 as a work area.

Figure 2:
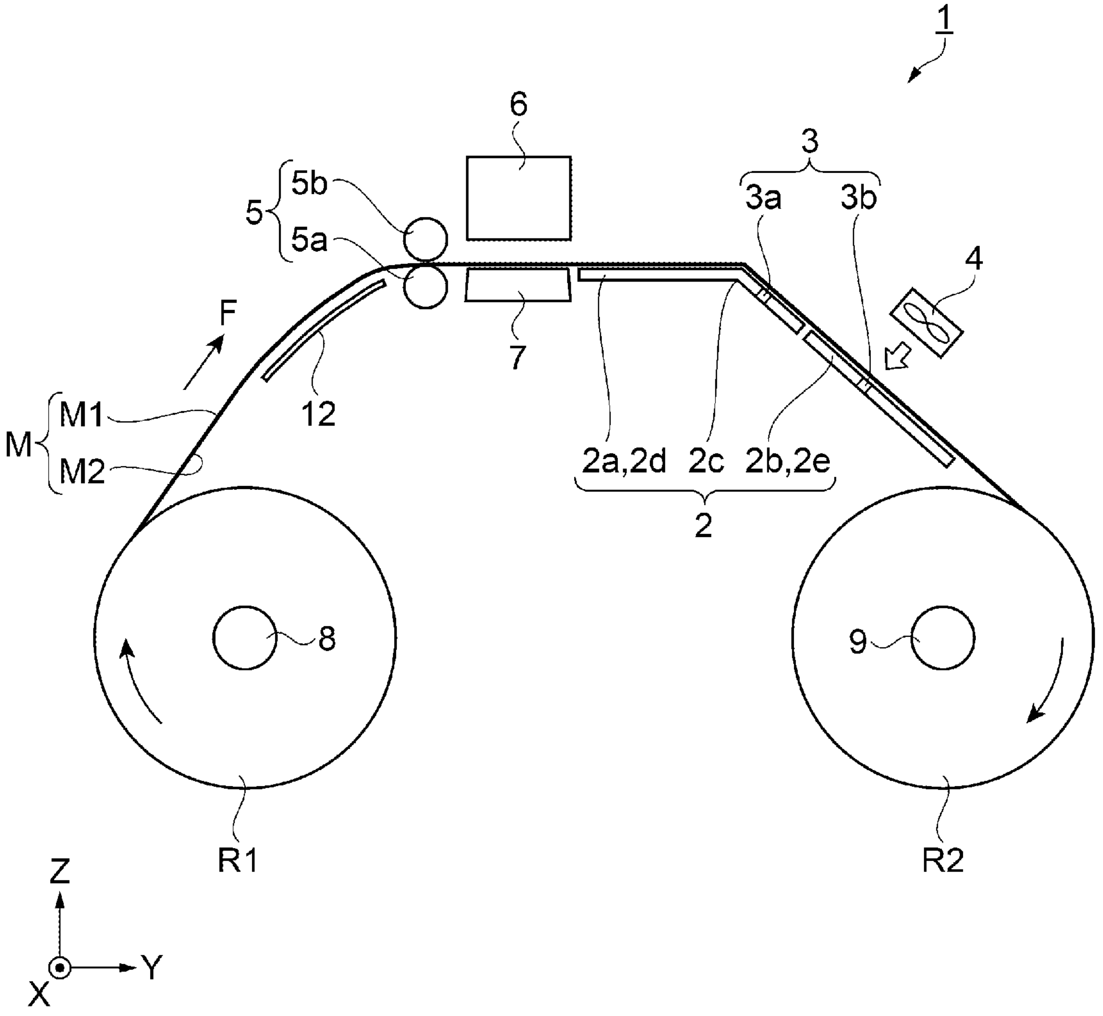
FIG. 2 is a schematic diagram illustrating cross-sectional configuration of the printing device.

The medium M illustrated in FIG. 2 is, for example, paper such as plain paper, synthetic paper, or photographic paper, and has an elongated shape. The medium M may be a fabric such as a natural fiber or a synthetic fiber.

The medium M is wound as a roll body R1 and is set in the feed section 8 of the printing device 1. The feed section

8 can draw out the medium M from the roll body R1 by rotating the roll body R1 clockwise using the feed motor.

The transporting section 5 includes a drive roller 5*a* and a driven roller 5*b*. The transport section 5 drives the drive roller 5*a* using the transport motor and transports the medium M sandwiched between the drive roller 5*a* and the driven roller 5*b* in the transport direction F. Note that the relationship of driving and driven between the drive roller 5*a* and the driven roller 5*b* may be reversed.

Note that the guide 12, the transport section 5, the printing section 6 and the platen 7, the heating section 2, and the blower section 4 are disposed from the upstream side to the downstream side in the transport direction F.

As shown in FIG. 2, the medium M drawn out from the roll body R1 is transported along the guide 12 by the transport section 5 and reaches a position between the printing section 6 and the platen 7, which face each other.

The printing section 6 is configured to include an ink jet head and a carriage. The carriage can be moved by a carriage motor. The printing device 1 can be mounted with ink cartridges or ink tanks storing ink of each color of, for example, cyan, magenta, yellow, and black (CMYK) as ink colors.

The printing section 6 includes a supply mechanism that supplies ink from an ink cartridge or the like to the head. The supply mechanism supplies ink of each color from an ink cartridge or the like to a corresponding nozzle of the head 13*a*.

The head is mounted on a carriage, and reciprocates in the left-right direction on the medium M together with the carriage by a carriage motor. Based on print data from the control section 10 and under control of the control section 10, the head ejects ink downward from the nozzles while moving over the medium M, and can print on a first surface M1, which is the print surface of the medium M.

The ink colors may be any combination of four or more colors including, for example, dark and light CMYK colors. The ink contains a solvent. For example, when the ink is Eco Solvent Ink, the ink contains a pigment and an organic solvent.

The heating section 2, which heats the medium M, is disposed downstream of the printing section 6 and the platen 7 in the transport direction F. The heating section 2 includes a first heating section 2*a* and a second heating section 2*b*. In addition, the first heating section 2*a* and the second heating section 2*b* are disposed in this order from the upstream to the downstream in the transport direction F.

The first heating section 2*a* and the second heating section 2*b* are configured to include heaters. The heater is, for example, a so-called tube heater. The periphery of the tube heater is insulated and covered with a metal case made of aluminum or the like.

The first heating section 2*a* includes a first support section 2*d*, which is a medium support section of the heating section 2, that supports the medium M upstream in the transport direction F. The first support section 2*d* is also a surface that guides the medium M in the transport direction F. The first support section 2*d* can contact and heat a second surface M2, which is the transport surface of the medium M.

Similarly, the second heating section 2*b* includes a second support section 2*e*, which is a medium support section in the heating section 2, that supports the medium M downstream in the transport direction F. The second support section 2*e* is also a surface that guides the medium M in the transport direction F. The second support section 2*e* can contact and heat the second surface M2 of the medium M.

The first support section 2*d* and the second support section 2*e* are formed of, for example, a metallic case that covers the tube heater described above.

The first support section 2*d* has a bent section 2*c*. The bent section 2*c* of the first support section 2*d* has a shape that bends from the front direction to the front lower direction from upstream to downstream in the transport direction F. The transport direction of the medium M changes from the front direction to the front lower direction by the bent section 2*c* of the first support section 2*d*. That is, when the medium M passes by the bent section 2*c* and is transported downstream in the transport direction F, the first surface M1 of the medium M changes from an upward facing posture to a forward facing posture. Note that when the bent section 2*c* is formed in an angular shape, a folding mark is formed on the medium M. Therefore, the bent section 2*c* is desirably formed to have an arc-shaped cross section as viewed from the right and left directions.

While being transported in the transport direction F by the transport section 5, the medium M that was printed on by the printing section 6 is heated by being in contact with the first support section 2*d* of the first heating section 2*a* and the second support section 2*e* of the second heating section 2*b* in this order.

The ink deposited on the medium M is heated from the second surface M2 of the medium M by the first heating section 2*a* and the second heating section 2*b* of the heating section 2. At this time, solvents contained in the ink escape from the first surface M1 of the medium M in the form of gas. In the following description, vaporization of a solvent is referred to as evaporation, and more specifically volatilization in the case of an organic solvent.

For example, in the case of the medium M printed with an Eco Solvent Ink, the medium M is heated from the second surface M2 by the heating section 2, the organic solvents are volatilized from the first surface M1, and the pigments remain on the medium M.

As will be described later, a predetermined tension is applied to the medium M that is being transported by the transport section 5 by being wound up by the winding section 9. For this reason, since the second surface M2 is forced into strong contact with the bent section 2*c* of the first support section 2*d*, heat is easily transferred, and evaporation of solvents from the first surface M1 is promoted.

The bent section 2*c* may be provided on the second support section 2*e* in addition to on the first support section 2*d*. By increasing the number of bent sections 2*c* that strongly contact the medium M, heat can be more easily transferred to the medium M.

The temperature detection section 3, which is capable of detecting the temperature of the heating section 2, is mounted on the heating section 2. The temperature detection section 3 includes, for example, a thermistor, which is a temperature detection element. The first temperature detection section 3*a* and the second temperature detection section 3*b* of the temperature detection section 3 are mounted on the first heating section 2*a* and the second heating section 2*b* of the heating section 2, respectively.

The first temperature detection section 3*a* and the second temperature detection section 3*b* can detect the temperatures of the first heating section 2*a* and the second heating section 2*b*, respectively. The first temperature detection section 3*a* and the second temperature detection section 3*b* are desirably mounted near the first support section 2*d* and the second support section 2*e*, respectively. This is because the first temperature detection section 3*a* and the second temperature detection section 3*b* will be able to detect the temperatures of the first support section 2*d* and the second support section 2*e*, which are in contact with the medium M.

The control section 10 includes an analog-to-digital converter (A/D converter), and can calculate a resistance value by inputting voltage related to temperature detection from the thermistor of the temperature detection section 3. A table of temperatures corresponding to resistance values of the thermistor is stored in the storage section 11.

The control section 10 can refer to the storage section 11 and acquire the temperature corresponding to the calculated resistance value from the temperature detection section 3. In this way, the control section 10 can detect the temperature of the heating section 2 using the temperature detection section 3.

The control section 10 can detect the temperature of the heating section 2 by the temperature detection section 3 and adjust the temperature of the heating section 2. For example, the control section 10 can adjust the temperature of the heating section 2 by controlling the power applied to the heating section 2 using a transistor or the like. In the following description, the control section 10 performing temperature adjustment of the heating section 2 is referred to as temperature control.

The control section 10 can execute so-called temperature feedback control for controlling electric power applied to the heating section 2 so that the temperature of the heating section 2 detected by the temperature detection section 3 becomes a predetermined value.

The control section 10 can control the temperature of the first heating section 2*a* based on the temperature detected by the first temperature detection section 3*a*. Separately and independently, the control section 10 can control the temperature of the second heating section 2*b* based on the temperature detected by the second temperature detection section 3*b*.

In this way, the control section 10 can individually control the temperature of each of the first heating section 2*a* and the second heating section 2*b* of the heating section 2.

Note that in order to volatilize the organic solvent contained in the Eco Solvent Ink from the medium M, it is desirable to set the temperature of the heating section 2 to 50° C. to 55° C. The control section 10 desirably controls the temperatures of the first heating section 2*a* and the second heating section 2*b* of the heating section 2 to 50° C. to 55° C.

Because the medium M is at a low temperature close to room temperature, it is desirable that the first heating section 2*a*, which first comes into contact with and heats the medium M, raise the temperature of the medium M as quickly as possible. Therefore, it is desirable that the control section 10 performs temperature control such that the first heating section 2*a* has a higher temperature than the second heating section 2*b*.

For example, it is desirable that the control section 10 controls the temperature of the first heating section 2*a* to 55° C. to 60° C. and controls the temperature of the second heating section 2*b* to 50° C. to 55° C.

The blower section 4 includes a fan. The blower section 4 is disposed at a position facing the second heating section 2*b*, with the medium M interposed therebetween, on the downstream side of the heating section 2 in the transport direction F. The blower section 4 can blow air toward the first surface M1 of the medium M that is placed on the second support section 2*e* of the second heating section 2*b* and heated.

As described above, the medium M is further heated by the second heating section 2*b* via the first heating section 2*a*, and the solvents evaporate from the first surface M1. The blower section 4 can blow off solvents evaporated from the first surface M1 of the medium M by blowing air, and can promote drying of the medium M.

In this manner, the medium M transported from the first heating section 2*a* to the second heating section 2*b* by the transport section 5 is further heated by the second heating section 2*b* while the blower section 4 blows air at it.

The heating section 2 has the first heating section 2*a* located at a position where air is not blown by the blower section 4 and air does not hit and the second heating section 2*b* located at a position where air is blown by the blower section 4 and air hits.

Meanwhile, since the second heating section 2*b* is cooled by the wind blown by the blower section 4, the temperature of the second heating section 2*b* tends to decrease more than compared to the first heating section 2*a*, which is not blown by the wind.

If the heating section 2 were not constituted by a plurality of heating sections such as the first heating section 2*a* and the second heating section 2*b*, but were integrally constituted, the control section 10 would not be able to individually control the temperature of each heating section.

As a result, in the heating section 2, if the control section 10 were to perform temperature control corresponding to the temperature of the section which is not hit by the wind, the temperature of the section which is hit by the wind may decrease excessively. On the other hand, in the heating section 2, if the control section 10 were to perform the temperature control corresponding to the temperature of the section to which the wind blows, then there is a concern that the temperature of the section to which the wind does not blow may rise excessively. The heating section 2 and the blower section 4 would not be able to appropriately dry the medium M.

The heating section 2 of the printing device 1 includes a plurality of heating sections such as the first heating section 2*a* and the second heating section 2*b*, and the control section 10 can individually control the temperature of each of the heating sections.

As a result, the control section 10 can control the temperature of both the first heating section 2*a*, which is not exposed to the air blown by the blower section 4, and the second heating section 2*b*, which is exposed to the air blown by the blower section 4, to be appropriate temperatures. The heating section 2 and the blower section 4 can appropriately dry the medium M.

The medium M dried by the heating section 2 and the blower section 4 is wound up as the wound roll body R2 by the winding section 9. The winding section 9 includes a winding motor and can rotate the wound roll body R2 clockwise.

At this time, the medium M contacts the first support section 2*d* of the first heating section 2*a*, is bent by the bent section 2*c* of the first support section 2*d*, contacts the second support section 2*e* of the second heating section 2*b*, and is then wound up by the winding section 9.

A predetermined tension is applied by the winding force of the winding section 9 to the medium M between the transport section 5 and the winding section 9. Due to the tension applied to the medium M, the second surface M2 of the medium M comes into strong contact with the first support section 2*d* and the second support section 2*e*. The second surface M2 of the medium M is particularly strongly pressed against the first support section 2*d* at the bent section 2*c*.

Since the second surface M2 of the medium M strongly contacts the first support section 2*d* and the second support section 2*e*, heat is easily conducted from the first support section 2*d* and the second support section 2*e* to the medium M. As a result, the medium M is easily dried.

Figure 3:
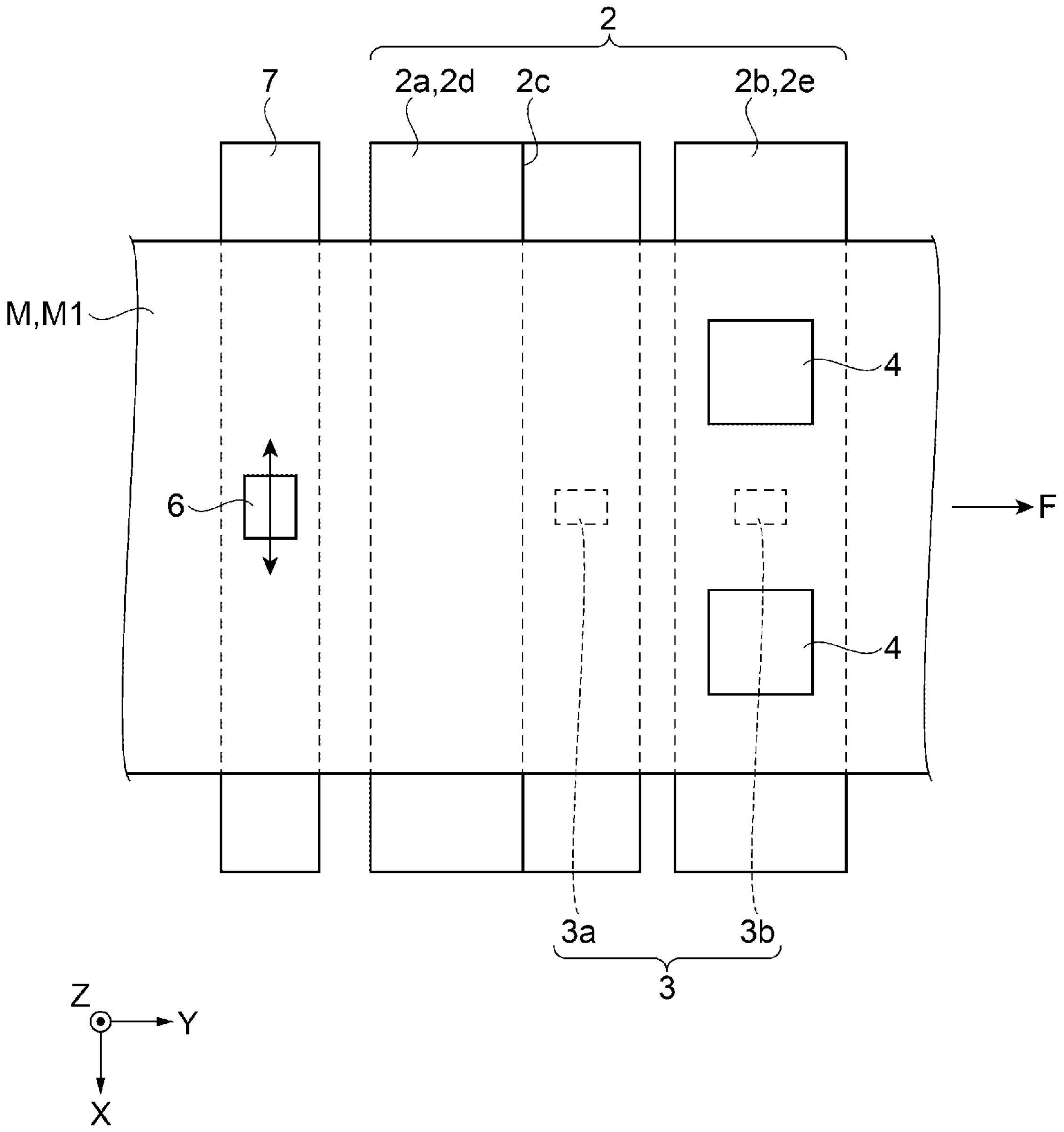
FIG. 3 is a schematic diagram illustrating configuration of main sections of the printing device of FIG. 2 as viewed from above.

FIG. 3 illustrates configuration of a main section of the printing device 1 in FIG. 2 as viewed from above. The printing section 6 and the platen 7, and the first heating section 2*a* and the second heating section 2*b* of the heating section 2 are disposed from upstream to downstream in the transport direction F of the medium M.

The medium M is placed on the platen 7, the first support section 2*d* of the first heating section 2*a*, and the second support section 2*e* of the second heating section 2*b* in this order from the upstream to the downstream in the transport direction F.

The printing section 6 performs printing by ejecting ink onto the first surface M1, which is the print surface of the medium M, while reciprocating in the left-right direction on the medium M.

The blower section 4 is disposed at a position facing the second heating section 2*b* with the medium M interposed therebetween. Here, an example is illustrated in which two fans of the blower section 4 are arranged side by side in the left-right direction, which is the width direction of the medium M.

The number of fans of the blower section 4 may be any number. From among the plurality of fans of the blower section 4, the control section 10 may select a fan at an arbitrary position to blow air on the basis of the width of the medium M.

The first support section 2*d* of the first heating section 2*a* includes the bent section 2*c* that changes the direction in which the medium M is transported. The first heating section 2*a* and the second heating section 2*b* of the heating section 2 respectively include the first temperature detection section 3*a* and the second temperature detection section 3*b* of the temperature detection section 3.

The first temperature detection section 3*a* and the second temperature detection section 3*b* are arranged side by side along the transport direction F. That is, the first temperature detection section 3*a* and the second temperature detection section 3*b* are disposed side by side at positions overlapping in the transport direction F. It is desirable that the first temperature detection section 3*a* and the second temperature detection section 3*b* be positioned at the center in the left-right direction.

1.2. Drying Method of Printing Device

Figure 4:
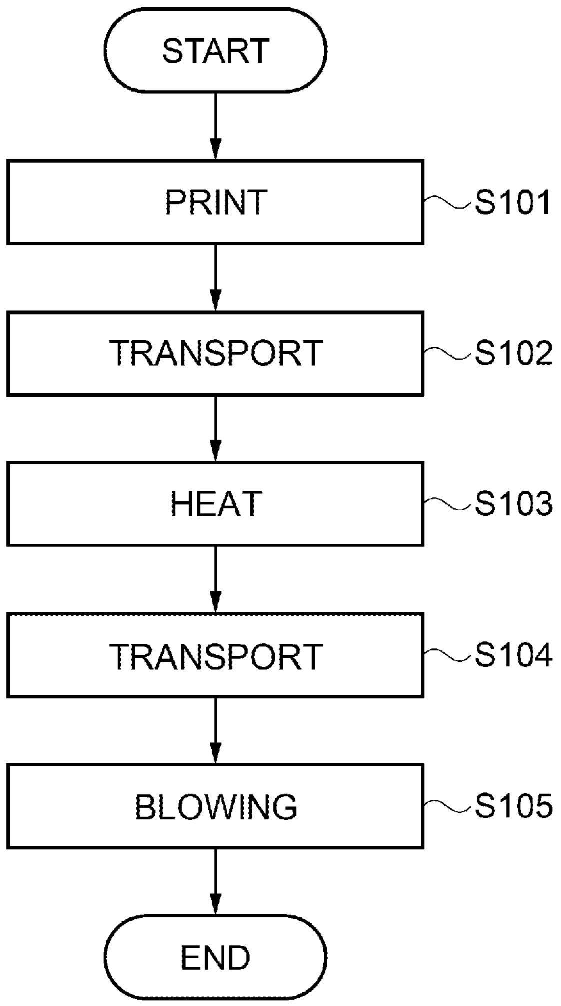
FIG. 4 is a flowchart illustrating control of the printing device.

As shown in FIG. 4, when the medium M is transported in the transport direction F by the transport section 5 and the position of the medium M to be printed on reaches the position of the printing section 6 and the platen 7, then the control section 10 executes a print step (S101) of performing printing by using the printing section 6 to eject ink onto the medium M. Note that, in FIG. 4, a print step or the like is simply referred to as print or the like, and "step" is omitted.

As described above, the heating section 2 includes the first heating section 2*a* located upstream in the transport direction F and the second heating section 2*b* located downstream in the transport direction F. The first heating section 2*a* is located at a position where air is not blown by the blower section 4, and the second heating section 2*b* is located at a position where air is blown by the blower section 4. The control section 10 performs a transport step of transporting the medium M in the transport direction F using the transport section 5 (S102). To be specific, the control section 10 uses the transport section 5 to transport the medium M printed on by the printing section 6 from the position of the printing section 6 and the platen 7 to the position of the first heating section 2*a*.

Next, the control section 10 executes a heat step (S103) of heating the medium M using the first heating section 2*a*, which is at a position where air is not blown by the blower section 4.

The first heating section 2*a* is provided with the first temperature detection section 3*a*. The control section 10 heats the medium M using the first heating section 2*a* while controlling the temperature of the first heating section 2*a* to be a predetermined temperature based on the temperature detected by the first temperature detection section 3*a*. First, the solvent of the ink ejected onto the medium M evaporates from the medium M due to the heating by the first heating section 2*a*.

Next, the control section 10 executes a transport step (S104) of transporting the medium M in the transport direction F by the transport section 5. To be specific, the control section 10 causes the transport section 5 to transport the medium M heated by the first heating section 2*a* from the position of the first heating section 2*a* to the position of the second heating section 2*b*.

Next, the control section 10 executes a blowing step (S105) of blowing air using the blower section 4 while further heating the transported medium M using the second heating section 2*b*.

The second heating section 2*b* is equipped with the second temperature detection section 3*b*. The control section 10 heats the medium M using the second heating section 2*b* while controlling the temperature of the second heating section 2*b* to a predetermined temperature based on the temperature detected by the second temperature detection section 3*b*. By the further heating by the second heating section 2*b*, the solvent of the ink ejected onto the medium M is further evaporated from the medium M.

The blower section 4 can blow off the solvent evaporated from the medium M and promote drying of the medium M.

The control section 10 can control the temperature of the first heating section 2*a* based on the temperature detected by the first temperature detection section 3*a*, and separately and independently control the temperature of the second heating section 2*b* based on the temperature detected by the second temperature detection section 3*b*.

As described above, the control section 10 can individually control the temperature of the first heating section 2*a* of the heating section 2 which is not struck by air blown by the blower section 4 and the temperature of the second heating section 2*b* which is struck by air blown by the blower section 4.

2. Drying Device Embodiment 2.1. Configuration of Drying Device

As illustrated in FIGS. 5 and 6, the drying device 1*a* has a configuration excluding at least the printing section 6 in the printing device 1, and common reference numerals are used for common sections. As shown in FIG. 6, the drying device 1*a* has a configuration in which the platen 7 is also removed compared to the printing device 1.

The drying device 1*a* includes the heating section 2, the temperature detection section 3, the blower section 4, the transport section 5, the feed section 8, the winding section 9, the control section 10, and the storage section 11.

The heating section 2 includes the first heating section 2*a* and the second heating section 2*b*. The temperature detection section 3 includes the first temperature detection section 3*a* and the second temperature detection section 3*b*, which are mounted on the first heating section 2*a* and the second heating section 2*b*, respectively.

The control section 10 controls the temperature of the first heating section 2*a* based on the temperature detected by the first temperature detection section 3*a*, and separately controls the temperature of the second heating section 2*b* based on the temperature detected by the second temperature detection section 3*b*.

The first heating section 2*a* is located at a position where air is not blown by the blower section 4, and the second heating section 2*b* is located at a position where air is blown by the blower section 4.

The control section 10 can individually control the temperature of each of the first heating section 2*a* and the second heating section 2*b*.

Since the configuration of each section of the drying device 1*a* is the same as that of the printing device 1 described above except for the printing section 6, the description thereof will be omitted.

2.2. Drying Method of Drying Device

Figure 7:
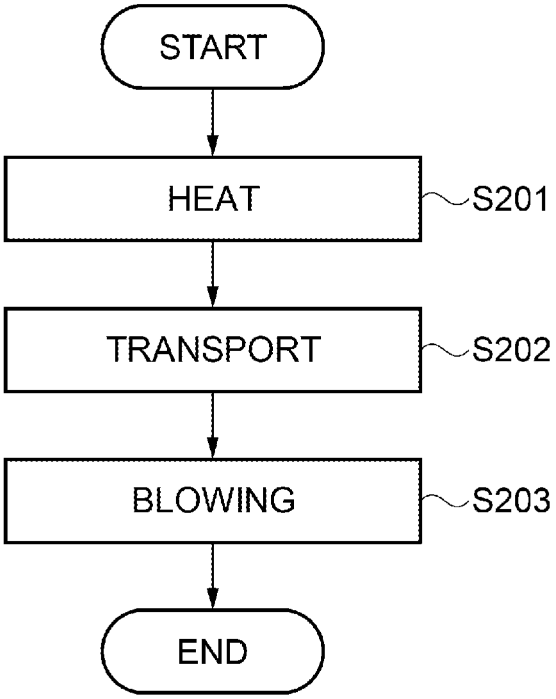
FIG. 7 is a flowchart illustrating control of the drying device.

The drying method of the drying device 1*a* shown in FIG. 7 is the same as the drying method of the printing device 1 shown in FIG. 4 except for printing by the printing section 6. To be specific, since the drying device 1*a* has a configuration excluding at least the printing section 6 from the printing device 1, the control section 10 of the drying device 1*a* does not execute the print step shown in FIG. 4 of printing on the medium M using the printing section 6.

Here, in the drying method of the drying device 1*a*, differences from the drying method of the printing device 1 described above will be mainly described. Note that as per the case of FIG. 4, "step" is omitted from the notation in FIG. 7.

As illustrated in FIG. 7, the control section 10 transports the medium M in the transport direction F using the transport section 5, and when the medium M reaches the position of the first heating section 2*a*, which is a position where air is not blown by the blower section 4, the control section 10 executes a heat step (S201) of heating the medium M using the first heating section 2*a*.

The control section 10 heats the medium M using the first heating section 2*a* while controlling the temperature of the first heating section 2*a* to be a predetermined temperature based on the temperature detected by the first temperature detection section 3*a*.

Next, the control section 10 executes a transport step (S202) of transporting the medium M in the transport direction F using the transport section 5, and transports the medium M from the position of the first heating section 2*a* to the position of the second heating section 2*b* using the transport section 5.

Next, the control section 10 executes an air blowing step (S203) of blowing air using the blower section 4 while further heating the transported medium M using the second heating section 2*b*.

The control section 10 further heats the medium M using the second heating section 2*b* while controlling the temperature of the second heating section 2*b* to a predetermined temperature based on the temperature detected by the second temperature detection section 3*b*.

In this way, the control section 10 can control the temperature in each of the heat step and the blowing step. That is, the control section 10 can individually control the temperature of each of the first heating section 2*a* and the second heating section 2*b* of the heating section 2. The drying device 1*a* can appropriately dry the medium M using the heating section 2 and the blower section 4.

As described above, the printing device 1 and the drying device 1*a* include the heating section 2 that heats the medium M, the transport section 5 that transports the medium M in the transport direction F, and the blower section 4 that blows air to the heated medium M. The heating section 2 includes the first heating section 2*a* located upstream in the transport direction F at a position where air is not blown by the blower section 4, and the second heating section 2*b* located downstream in the transport direction F at a position where air is blown by the blower section 4.

The first heating section 2*a* includes the first temperature detection section 3*a*, and the second heating section 2*b* includes the second temperature detection section 3*b*. The control section 10 can individually control the temperatures of the first heating section 2*a* and the second heating section 2*b* based on the temperatures detected by the first temperature detection section 3*a* and the second temperature detection section 3*b*.

As a result, the control section 10 can control both the first heating section 2*a*, which is not struck by air blown from the blower section 4, and the second heating section 2*b*, which is struck by air blown from the blower section 4, to have appropriate temperatures. The heating section 2 and the blower section 4 can appropriately dry the medium M.

Although these embodiments have been described in detail with reference to the drawings, specific configurations are not limited to these embodiments, and may be changed, replaced, deleted, or the like without departing from the scope of the present disclosure. In addition, the following other embodiments may be adopted.

For example, in the above-described example, the printing section 6 of the printing device 1 is described as a so-called serial type in which the head is mounted on the carriage and moves, but may be a so-called line type in which the head is fixed and without the carriage.

In the heating section 2, the second heating section 2*b* may further include an upstream heating section located at a position facing the blower section 4 and a downstream heating section that is located downstream of the upstream heating section in the transport direction F and that does not face the blower section 4.

In this case, an upstream temperature detection section and a downstream temperature detection section are mounted on the upstream heating section and the downstream heating section, respectively, of the second heating section 2*b*.

The control section 10 can control the temperature of the upstream heating section based on the temperature detected by the upstream temperature detection section. Separately, the control section 10 can control the temperature of the downstream heating section based on the temperature detected by the downstream temperature detection section. When the solvent evaporates from the medium M, the temperature of the medium M easily decreases due to vaporization heat. However, it is considered that a difference occurs in the decrease in the temperature of the medium M due to a difference in the degree of progress of drying between the upstream and the downstream in the transport direction F. The temperature may also fluctuate depending on the amount of ink discharged onto the medium M. For this reason, it is possible to more appropriately heat the medium M by independently controlling the temperature of the upstream heating section and the downstream heating section in the second heating section 2*b* in which drying easily progresses.

In this way, the control section 10 can individually control the temperature of each of the upstream heating section and the downstream heating section of the second heating section 2*b*. The control section 10 can control the heating section 2 to have a more appropriate temperature, and can dry the medium M more appropriately.

In addition, the heating section 2 may be divided into a plurality of heating sections 2 in the width direction of the medium M. A temperature detection section 3 is mounted on each of the heating sections 2. The control section 10 can individually control the temperatures of the respective heating sections 2 based on the temperatures detected by the respective temperature detection sections.

What is claimed is:

1. A drying method comprising:
heating a medium with a heater covered in a metallic case;
transporting the medium in a transport direction; and
blowing air to the medium while heating the transported medium, wherein
temperature adjustment is performed during heating and during blowing, and
the heating further comprises heating the medium with a first heater which performs temperature adjustment so that a temperature of the first heater is higher than a temperature of a second heater, the first heater being located upstream of the second heater in the transport direction.

2. A drying device comprising:
a heater covered in a metallic case that heats a medium;
a transport section that transports the medium in a transport direction; and
a blower configured to blow air to the heated medium, wherein
the heater includes a first heater to which air is not blown by the blower and a second heater to which air is blown by the blower,
the first heater and the second heater each perform temperature adjustment, and
the first heater performs temperature adjustment so that a temperature of the first heater is higher than a temperature of the second heater, the first heater being located upstream of the second heater in the transport direction.

3. A printing device comprising:
a printing section that performs printing by ejecting ink onto a medium;
a heater covered in a metallic case that heats the medium;
a transport section that transports the medium in a transport direction; and
a blower configured to blow air to the heated medium, wherein
the heater includes a first heater to which air is not blown by the blower and a second heater to which air is blown by the blower,
the first heater and the second heater each perform temperature adjustment, and
the first heater performs temperature adjustment so that a temperature of the first heater is higher than a temperature of the second heater, the first heater being located upstream of the second heater in the transport direction.

4. The printing device according to claim 3, wherein
each of the first heater and the second heater includes a medium support that supports the medium and, at least in the first heater, the medium support includes a bent section that changes direction in which the medium is transported.

5. The printing device according to claim 3, wherein
the first heater includes a first temperature detection section, the second heater includes a second temperature detection section, and the first temperature detection section and the second temperature detection section are provided at positions overlapping each other in the transport direction.

6. The printing device according to claim 3, wherein
the second heater includes
an upstream heating section that faces the blower and
a downstream heating section that does not face the blower and that is located downstream of the upstream heating section in the transport direction and
the upstream heating section and the downstream heating section each perform temperature adjustment.

7. The method of claim 1, wherein the heating further comprises heating the medium with each of a first heater and a second heater including a medium support that supports the medium and, at least in the first heater, the medium support including a bent section that changes direction in which the medium is transported.

8. The method of claim 1, wherein the heating further comprises heating the medium with a first heater including a first temperature detection section, a second heater including a second temperature detection section, and the first temperature detection section and the second temperature detection section being provided at positions overlapping each other in the transport direction.

9. The method of claim 1, wherein the heating further comprises heating the medium with a second heater which includes an upstream heating section that faces a blower and a downstream heating section that does not face the blower and that is located downstream of the upstream heating section in the transport direction and the upstream heating section and the downstream heating section each perform temperature adjustment.

10. The drying device according to claim 2, wherein each of the first heater and the second heater includes a medium support that supports the medium and, at least in the first heater, the medium support includes a bent section that changes direction in which the medium is transported.

11. The drying device according to claim 2, wherein the first heater includes a first temperature detection section, the second heater includes a second temperature detection section, and the first temperature detection section and the second temperature detection section are provided at positions overlapping each other in the transport direction.

12. The drying device according to claim 2, wherein the second heater includes an upstream heating section that faces the blower and a downstream heating section that does not face the blower and that is located downstream of the upstream heating section in the transport direction and the upstream heating section and the downstream heating section each perform temperature adjustment.

* * * * *